US010076126B2

(12) United States Patent
Kraehenbuehl et al.

(10) Patent No.: US 10,076,126 B2
(45) Date of Patent: Sep. 18, 2018

(54) PROCESS FOR PREPARING A FLAVOUR COMPOSITION

(71) Applicant: NESTEC S.A., Vevey (CH)

(72) Inventors: Karin Kraehenbuehl, Fully (CH); Tomas Davidek, Correvon (CH); Florian Viton, Lausanne (CH); Heiko Oertling, Lausanne (CH); Rachid Belrhlid, Savigny (CH)

(73) Assignee: Nestec S.A., Vevey (CH)

( * ) Notice: Subject to any disclaimer, the term of this patent is extended or adjusted under 35 U.S.C. 154(b) by 344 days.

(21) Appl. No.: 15/023,836

(22) PCT Filed: Sep. 23, 2014

(86) PCT No.: PCT/EP2014/070247
§ 371 (c)(1),
(2) Date: Mar. 22, 2016

(87) PCT Pub. No.: WO2015/044136
PCT Pub. Date: Apr. 2, 2015

(65) Prior Publication Data
US 2016/0242442 A1 Aug. 25, 2016

(30) Foreign Application Priority Data

Sep. 24, 2013 (EP) .................................... 13185655

(51) Int. Cl.
*A23L 27/21* (2016.01)
*A23K 20/10* (2016.01)
*A23L 27/20* (2016.01)

(52) U.S. Cl.
CPC ............ *A23K 20/10* (2016.05); *A23L 27/201* (2016.08); *A23L 27/2056* (2016.08); *A23L 27/215* (2016.08)

(58) Field of Classification Search
CPC ..... A23K 20/10; A23L 27/215; A23L 27/201; A23L 27/2056
See application file for complete search history.

(56) References Cited

U.S. PATENT DOCUMENTS

| | | | | |
|---|---|---|---|---|
| 3,425,840 A | * | 2/1969 | Walden | ................. A23L 27/215 426/19 |
| 4,001,437 A | | 1/1977 | Jaeggi et al. | |
| 4,879,130 A | * | 11/1989 | Heyland | ................. A23P 30/34 426/533 |
| 2009/0117628 A1 | * | 5/2009 | Gorke | ...................... C12N 9/00 435/129 |
| 2013/0217791 A1 | | 8/2013 | Hines et al. | |

FOREIGN PATENT DOCUMENTS

| | | | | |
|---|---|---|---|---|
| CN | 101715939 | | 6/2010 | |
| WO | WO-2005096844 A1 | * | 10/2005 | ........... A23L 1/2275 |
| WO | WO-2011073035 A1 | * | 6/2011 | ........... A23L 27/215 |
| WO | 2012035032 | | 3/2012 | |

OTHER PUBLICATIONS

Abbas, Q., and Binder, L. 2010. "Synthesis and characterization of choline chloride based binary mixtures." ECS Transactions. vol. 33, pp. 49-59.*
Abbott, A.P., Boothby, D., Capper, G., Davies, D.L., and Rasheed, R.K. 2004. "Deep Eutectic Solvents Formed between Choline Chloride and Carboxylic Acids: Versatile Alternatives to Ionic Liquids." J. Am. Chem. Soc. vol. 126, pp. 9142-9147.*
Abbott, A.P., Capper, G., Davies, D.L., and Rasheed, R.K., and Tambyrajah, V. 2003. "Novel solvent properties of choline chloride/urea mixtures." Chem. Commun. pp. 70-71.*
Naser, J., Mjalli, F., Jibril, B.,Al-Hatmi, S., and Gano, Z. 2013. "Potassium Carbonate as a Salt for Deep Eutectic Solvents." International Journal of Chemical Engineering and Applications. vol. 4, pp. 114-118.*
Imperato, G., Eibler, E., Niedermaier, J., Konig, B. 2005. "Low-melting sugar-urea-salt mixtures as solvents for Diels-Alder reactions." Chem. Commun., pp. 1170-1172.*
Cerny et al. "Role of the Solvent Glycerol in the Maillard Reaction of D-Fructose and L-Alanine" Journal of Agricultural and Food Chemistry, 2006, vol. 54, pp. 574-577.

* cited by examiner

*Primary Examiner* — Nikki H Dees
(74) *Attorney, Agent, or Firm* — K&L Gates LLP

(57) ABSTRACT

The present invention relates to flavor generation. In particular the invention relates to a process for the preparation of a flavor composition. The process comprises combining glycerol with a quaternary ammonium compound, adding at least one flavor precursor to form a reaction mixture and heating the reaction mixture to form aroma compounds, wherein the glycerol is combined with a quaternary ammonium compound at a molar ratio ranging between 5:1 and 0.8:1. The flavor precursor comprises preferably an amino compound such as an amino acid. A further aspect of the invention is a food product comprising the flavor composition obtainable by the process of the invention.

13 Claims, 4 Drawing Sheets

PROCESS FOR PREPARING A FLAVOUR COMPOSITION

THE CROSS REFERENCE TO RELATED APPLICATIONS

The present application is a National Stage of International Application No. PCT/EP2014/070247 filed on Sep. 23, 2014, which claims priority to European Patent Application No. 13185655.1, filed Sep. 24, 2013, the entire contents of which are being incorporated herein by reference.

The present invention relates to flavor generation. In particular the invention relates to a process for the preparation of a flavor composition. The process comprises combining glycerol with a quaternary ammonium compound, adding at least one flavor precursor to form a reaction mixture and heating the reaction mixture to form aroma compounds. A further aspect of the invention is a food product comprising the flavor composition obtainable by the process of the invention.

Reaction flavors, sometimes called process flavors, are complex building blocks that provide similar aroma and taste properties to those found in thermally treated foodstuffs such as meat, chocolate, coffee, caramel, popcorn and bread. Traditionally, flavor compounds are produced in solution, most commonly in a buffered water system at a certain pH. The complex chemistry behind those flavor generating reactions is commonly termed "Maillard" chemistry. This has been described by many sources [M. K. Sucan et al., "Process and Reaction Flavors", ACS Symposium Series 2005, 905, 1-23]. Most commonly the desired key value molecules are generated by mixing a reducing sugar and an amino acid in the respective matrix and heating for a certain period of time. WO2008148737 for example describes adding flavor precursors (amino acids and reducing sugars) directly to ingredients which are then baked to form baked foodstuffs.

Generally, the Maillard chemistry is most effective in generating flavor components when the water activity is low. In order to make reaction flavors with a broad range of aroma compounds, and to do so as efficiently as possible, several methods using liquid phases with low water activity have been proposed.

U.S. Pat. No. 3,425,840 describes dissolving proline in glycerol or sorbitol and heating to generate fresh-bread aroma. In WO2005096844 process flavors are generated by heating a combination of a carbohydrate source and a nitrogen source in a continuous liquid phase comprising at least 10% of an alpha-hydroxycarboxylic acid. WO201173035 describes reacting flavor precursors in a structured lipid phase with a dispersed polar solvent. EP0571031 describes a process for the preparation of a savoury flavor comprising reacting mono and or di-methyl-3(2H)-furanone with cystein and or hydrogen sulphide. The reaction is carried out in a medium comprising an organic polar solvent such as glycerol or propylene glycol and less than 20% of water.

The combination of glycerol and quaternary ammonium compounds is known to form a deep eutectic solvent. Deep eutectic solvents are liquids having a melting point that is much lower than the melting points of the compounds which form the eutectic mixture. US2009/0117628 explains how deep eutectic solvents can be used for performing enzymatic reactions. One of the deep eutectic solvents is a combination of glycerol with choline chloride, However, the generation of aroma compounds in such deep eutectic solvents has not been described.

CN101715939 describes forming a reaction flavor from a mixture comprising amino acids, reducing sugars, sulphur compounds, proteins, yeast extract, butter, salt, glycerol and egg powder. The molar ratio of glycerol to choline (from the egg) is between 38:1 and 225:1. The mixture is a powder.

Usually, when generating a process flavor, a mixture of several key aroma compounds is formed. This does not just depend on the nature of the flavor precursor materials, but also on the process used and the reaction medium. Different aroma compound mixtures provide different sensory characteristics. There is a need to provide new flavor generation processes which can efficiently generate desirable mixtures of aroma compounds, preferably in a reaction mixture suitable for direct incorporation into foodstuffs.

An object of the present invention is to improve the state of the art and to provide an improved process for the preparation of flavor compositions or at least to provide a useful alternative. Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The object of the present invention is achieved by the subject matter of the independent claims. The dependent claims further develop the idea of the present invention.

The present invention provides in a first aspect a process for the preparation of a flavor composition comprising combining glycerol with a quaternary ammonium compound; adding at least one flavor precursor to form a reaction mixture; and heating the reaction mixture to form aroma compounds. A further aspect of the invention is a food product comprising the flavor composition obtainable by the process of the invention.

It has been surprisingly found by the inventors that a combination of glycerol with a quaternary ammonium compound may be used as a medium in which to react flavor precursors. The profile of aroma compounds produced is different from that obtained in conventional solvent systems such as water, or glycerol alone. For example, reacting L-cysteine and xylose in a mixture of glycerol and choline chloride generated higher levels of the volatile 2-methyl-3-furanthiol (MFT), and even more surprisingly a higher ratio of MFT/FFT (FFT, 2-furfurylthiol) than reacting the same amounts of L-cysteine and xylose in glycerol alone, or in an aqueous buffer. MFT is a marker for meat flavor generation and a higher ratio of MFT/FFT is associated to a more intense and more typical meaty flavor perception in L-cysteine/xylose systems.

Figure 1:
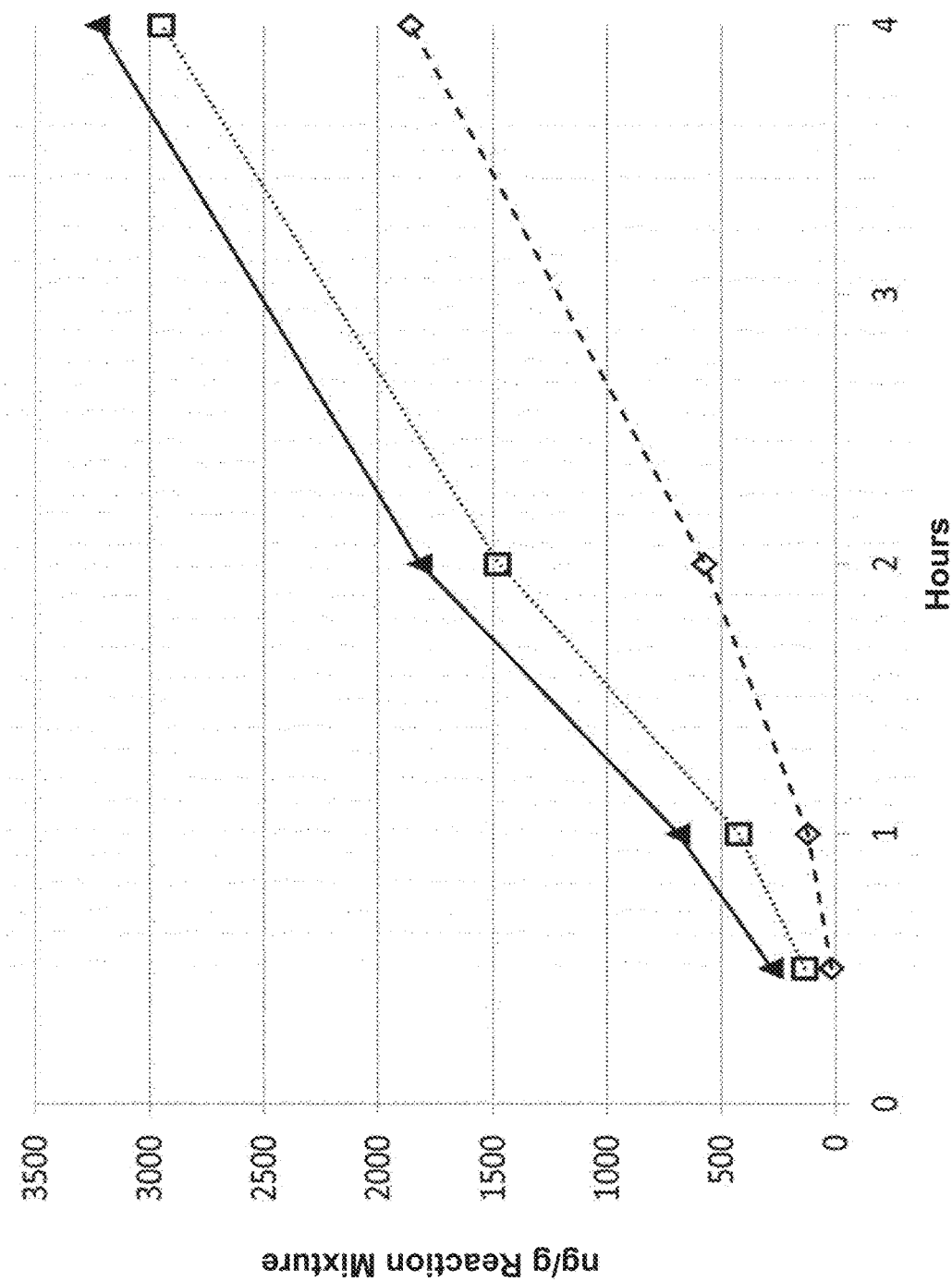
FIG. 1 shows the quantity of 2-methyl-3-furanthiol (ng/g reaction mixture) generated at different reaction times (hours) when reacting xylose and cysteine. The results in three different solvents are shown: aqueous buffer ◇, glycerol ☐, and choline chloride/glycerol ▲.

The present invention relates in part to a process for the preparation of a flavor composition comprising combining glycerol with a quaternary ammonium compound; adding at least one flavor precursor to form a reaction mixture; and heating the reaction mixture to form aroma compounds. Preferably all the materials used in preparing the flavor composition are edible, as this allows the heated reaction mixture to be added to a food directly, rather than having to extract the aroma compounds, for example into an edible solvent, before use in food The high viscosity of glycerol (1200 cP at room temperature) makes it difficult to use as a solvent. However, the addition of a quaternary ammonium compound has a significant effect on the fluid properties. Abbott et al., [Andrew P. Abbott et al., Green Chemistry, 13, 82-90 (2011)] have shown that the addition of 33 mol % choline chloride decreases the viscosity of glycerol by a factor of 3. Abbott et al. also observed that the acid catalysed esterification of glycerol with lauric acid leads to a markedly different product distribution when choline chloride is added. However, esterification proceeds by a different chemical pathway to aroma generation, for example aroma generation via the Maillard reaction, so the inventors were surprised to find that the process of the current invention was able to produce flavor compositions with new and desirable aroma profiles. Glycerol may be combined with a quaternary ammonium compound by methods well known in the art, for example the two components may be stirred at around 80° C. until a homogeneous mixture is obtained. A small amount of water may be added to the combination of glycerol with a quaternary ammonium compound, for example the amount of water may be below 20 wt. % of the combined weight of glycerol and quaternary ammonium compound, for example below 10 wt. % of the combined weight of glycerol and quaternary ammonium compound, for further example below 1 wt. % of the combined weight of glycerol and quaternary ammonium compound. The reaction mixture may contain less than 20 wt. % water, for example less than 10 wt. % water, for further example less than 1 wt. % water.

The at least one flavor precursor of the process of the invention are those well known in the art, for example they may be compounds which decompose when heated to form aroma compounds and/or they may be materials which take part in the Maillard reaction. The Maillard reaction is most commonly known as the reaction of an amino group, e.g. an amino acid, peptide or protein, with the carbonyl group of a sugar, followed by a complex reaction pathway which results in the formation of a variety of volatiles and non-volatiles. The at least one flavor precursor may react with the glycerol and/or with the quaternary ammonium compound to form aroma compounds. Where there are two or more flavor precursors they may react with each other.

Heating the reaction mixture to form aroma compounds accelerates the reaction. The aroma profile obtained will vary according to the temperature and time of heating. In the present process the reaction mixture may be heated to a temperature of between 60 and 180° C. The reaction mixture may be heated for a period of 0.1 to 8 hours. An advantage of the process of the invention is that good solubility of flavor precursors can be obtained in a mixture of glycerol with a quaternary ammonium compound, providing concentrated flavor compositions. With good solubility of flavor precursors, such as amino acids and reducing sugars, lower temperatures can be employed to get them into solution. Low temperatures are desirable when generating Maillard compounds due to the compounds' volatile nature. Short heating periods and low temperatures avoid losses (sometimes called "strip-off") of desirable aroma compounds. The reaction mixture may be heated at a temperature between 60 and 140° C. for a period of 0.1 to 2 hours. Preferably the reaction mixture is heated in a sealed vessel, or in a vessel where volatiles can be captured and fed back into the reaction. The quaternary ammonium compound may be dissolved in the glycerol.

The reaction mixture in the process of the invention may be a liquid, for example a liquid at 20° C. Having a liquid reaction mixture facilitates the handling of the material, avoids excessive losses of volatiles and leads to improved process homogeneity. Glycerol may be combined with a quaternary ammonium compound in the process of the invention at a molar ratio ranging between 5:1 and 0.8:1, for example between 3:1 and 1:1. The greater the proportion of quaternary ammonium compound, the lower the viscosity. However, the maximum amount of quaternary ammonium compounds will be determined by its solubility in glycerol. In addition, quaternary ammonium compounds are generally much more expensive than glycerol. A skilled person will have no difficulty in establishing an appropriate ratio of glycerol to quaternary ammonium compound, balancing the advantageous effects of the process of the invention against solubility and cost.

Very high ratios of glycerol to quaternary ammonium compounds, for example greater than 5:1 will not provide the advantageous reduction in viscosity. The glycerol and quaternary ammonium compound together may be at least 30 wt. % of the flavor composition, for example at least 50 wt. % of the flavor composition.

The quaternary ammonium compound used in the process of the invention may be choline, betaine or carnitine. The term choline is applied to salts of the 2-hydroxy-N,N,N-trimethylethanaminium cation. Choline is a water-soluble essential nutrient. The choline used in the process of the invention may be in the form of choline chloride. In the context of the present invention, betaine refers to trimethylglycine, sometimes called glycine betaine. Carnitine, 3-hydroxy-4-(trimethylazaniumyl) butanoate, is a quaternary ammonium compound which may be biosynthesized from the amino acids lysine and methionine.

The at least one flavor precursor of the process of the invention may be an amino compound selected from the group consisting of amino acids, peptides and amino acid derivatives. An amino acid derivative is a compound that is derived from an amino acid compound by some chemical process. An example of an amino acid derivative is dihydroxyphenylalanine, a beta-hydroxylated derivative of phenylalanine. The amino compound may not be a quaternary ammonium compound. The amino compound may be an amino acid.

At least two flavor precursors may be added to form a reaction mixture in the process of the invention; the flavor precursors comprising at least one amino compound selected from the group consisting of amino acids, peptides and amino acid derivatives; and at least one polyol which is not glycerol.

Amino compounds used in the process of the invention may selected from the group consisting of glycine, alanine, valine, norvaline, leucine, norleucine, aspartic acid, glutamic acid, asparagine, glutamine, arginine, lysine, serine, threonine, proline, tyrosine, cysteine, cystine, methionine, phenylalanine, histidine, tryptophan, dihydroxyphenylalanine, taurin, thiamine, carnosine and mixtures of these. Such amino compounds are particularly suitable as flavor precursors as they generate a range of aromas when reacted with polyols and are edible.

The at least one polyol comprised within the flavor precursors of the process of the invention may be a reducing sugar. A reducing sugar is any sugar that either has an aldehyde group or is capable of forming one in solution through isomerism. Reducing sugars include aldoses or ketoses such as glucose, fructose, maltose, lactose, glyceraldehyde, dihydoxyacetone, arabinose, xylose, ribose, mannose, erythrose, threose, and galactose. The at least one polyol comprised within the flavor precursors of the process of the invention may be an alkane polyol. Alkane polyols are known to react with amino compounds such as proline to form aromas [U.S. Pat. No. 3,425,840]. Suitable alkane polyols include for example erythritol, xylitol, ribitol, sorbitol, dulcitol, mannitol, isomalt, maltitol and lactitol. The at least one polyol comprised within the flavor precursors of the process of the invention may be selected from the group consisting of sorbitol; glucuronic acid; 5-keto-gluconic acid; galacturonic acid; iduronic acid; maltodextrin; glucose syrup; rhamnose; xylose; glucose; fructose; sucrose; lactose; maltose, xylitol, maltitol, erythritol, mannitol and mixtures of these. The term glucose syrup refers to a hydrogenated starch syrup. The at least one polyol comprised within the flavor precursors of the process of the invention may be 5-keto-gluconic acid. The at least one amino compound and at least one polyol may be cysteine and xylose respectively.

Providing sulphur compounds in the reaction mixture may be important for the generation of certain aromas, especially meaty aromas. Some amino acids such as cysteine already contain sulphur, but it may be advantageous to add further sulphur containing compounds. The at least one flavor precursor of the process of the invention may further comprise a source of sulphur. The source of sulphur may be ammonium sulphide.

In the process of the invention a liquid solvent may be added to the reaction mixture before heating, the liquid solvent being selected from the group consisting of water, ethanol, polyethylene glycol or mixtures of these. The liquid solvent may be water. The combination of glycerol and quaternary ammonium compound may be at least 60 wt. % of the reaction mixture.

An aspect of the invention is a food product comprising the flavor composition obtainable by the process of the invention. The flavor composition prepared by the process of the invention is preferably formed from components which are all food grade. It is advantageous not to have to remove any non-food grade material, for example a non-food grade solvent, before using the flavor composition in a foodstuff. By using a combination of glycerol and a quaternary ammonium compound for preparing a flavor composition the flavor composition may be highly concentrated. For example, it may have zero or low levels of water. The flavor composition may be added directly to a finished foodstuff, for example as a taste enhancer sprayed onto extruded dog or cat food, or the flavor composition may be incorporated as an ingredient in a part-finished product which is further processed, for example being added to a wafer batter before baking. The flavor composition may develop additional aroma compounds during further processing of the foodstuff. The flavor composition may comprise less than 5 wt. % of the food product of the invention, for example less than 1 wt. % of the food product. The food product of the invention may comprise less than 1 wt. % quaternary ammonium compound.

Salt (sodium chloride) is a food ingredient traditionally used for preservation, but now often simply added for taste. Unfortunately, eating too much sodium can lead to health problems such as high blood pressure. Flavor compositions, such as may be prepared by the process of the invention, can boost the overall savoury flavor impact when added to a food product and so make the food palatable with lower levels of salt. Where the flavor composition includes choline chloride as quaternary ammonium compound there is an additional beneficial effect as choline chloride is known to enhance the saltiness of edible materials which already contain sodium chloride (U.S. Pat. No. 5,206,049). The food product comprising the flavor composition obtainable by the process of the invention may contain 140 mg of sodium or less per 100 g. The U.S. Food and Drug Administration define meals and main dishes to be "low in sodium" if they contain 140 mg or less of sodium per 100 g.

The food product of the invention may be a bakery product, a dairy product, a confectionery product, a cereal product (for example a breakfast cereal) or a culinary product. Culinary products are food compositions typically prepared or used in kitchens. Culinary products which may comprise the flavor composition according to the invention include soups, sauces, bouillon, liquid seasonings and prepared meals. The dairy products may be for example milk-based powders, ice creams, cheese, fermented milks, and yogurt. The food product of the invention may be pet food.

Those skilled in the art will understand that they can freely combine all features of the present invention disclosed herein. In particular, features described for the process of the present invention may be combined with the product of the present invention and vice versa. Further, features described for different embodiments of the present invention may be combined. Where known equivalents exist to specific features, such equivalents are incorporated as if specifically referred to in this specification. Further advantages and features of the present invention are apparent from the figures and non-limiting examples.

EXAMPLES

Example 1

Reaction of Xylose and Cysteine

The flavor precursors xylose and cysteine were reacted together in three different solvents; A) choline chloride and glycerol in a 1:1 molar ratio, B) glycerol, and C) an aqueous phosphate buffer at pH 5.5.

For each solvent, 75 mg of xylose (Fluka) and 60 mg of L-cysteine (Fluka) were weighed into 2.0 g of the solvent in a series of glass vials, together with an internal reference of labeled [$^2$H$_3$]-2-methyl-3-furanthiol (MFT aromaLAB AG, Product number 2119) and [$^2$H$_2$]-2-furfurylthiol (FFT) (aromaLAB AG, Product number 2032). The vials were crimped and the contents mixed at room temperature using a Vortex mixer until a homogeneous reaction mixture was obtained. The vials was then heated to 110° C. in an oil bath for periods between 30 minutes and 4 hours before being cooled in a crushed ice bath and stored at −20° C. until analyzed.

Figure 2:
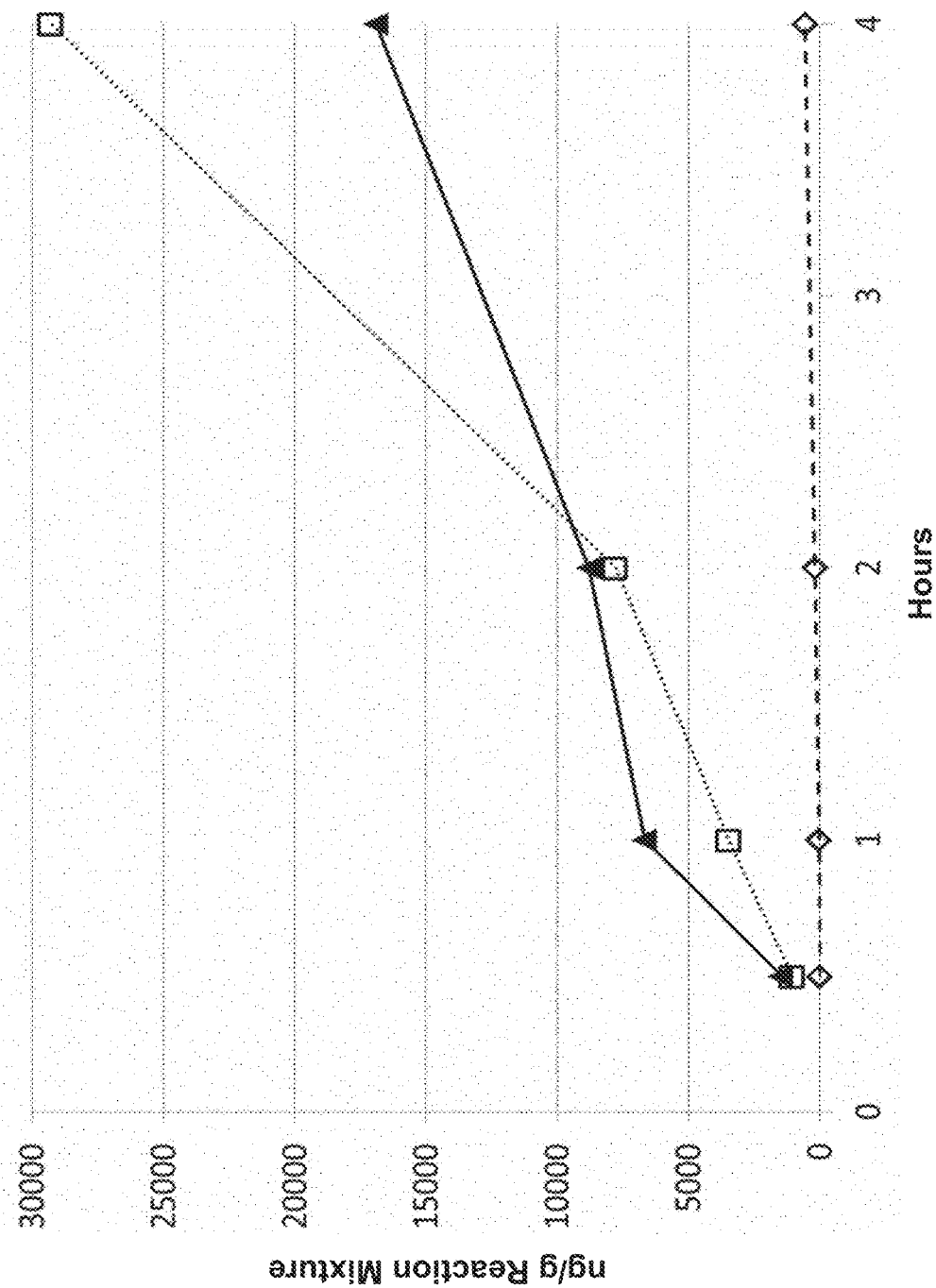
FIG. 2 shows the quantity of 2-furfurylthiol (ng/g reaction mixture) generated at different reaction times (hours) when reacting xylose and cysteine. The results in three different solvents are shown: aqueous buffer ◇, glycerol ☐, and choline chloride/glycerol ▲.

Analysis was performed by solid-phase micro-extraction (SPME) headspace analysis combined with GC-MS to determine the amount of MFT and FFT generated in the different reaction mixtures. The following SPME/GC-MS conditions were used: GC-MS analyses were performed on a GC 6890A coupled to an MSD 5973 (both Agilent, Palo Alto, Calif.) using a HP5-MS column (30 m×0.25 mm×0.250 µm). A SPME fiber coated with polydimethylsiloxane/divinylbenzene with 75 µm film thickness (Supelco no 57345-U) was exposed to the headspace above the samples in the glass vials and allowed to equilibrate for 15 min at 40° C. with agitation (pre-incubation time: 5 min). After sampling, the SPME device was placed for 5 min in the GC injector and heated at 250° C. The injector was operated in splitless mode for 2 min, after which the split ratio was 20:1. Helium was used as carrier gas (1 mL/min, constant flow). The oven temperature was programmed as follows: hold at 25° C. for 5 min, then 6° C./min from 25° C. to 180° C. and at 10° C./min from 180° C. to 240° C., then hold at 240° C. for 5 min. The temperature of the ion source was 280° C. Mass spectra in the electron impact mode (EI) were generated at 70 eV and at a scan range from m/z 29-350. The quantities of MFT and FFT are plotted in FIGS. 1 and 2. It can be seen that both glycerol and the combination of glycerol and choline chloride produced more MFT and FFT than the aqueous buffer. By combining glycerol and choline chloride, different quantities of the aroma compounds MFT and FFT were obtained than for glycerol alone. In particular, higher quantities of MFT were produced. This shows that the use of a combination of glycerol and choline chloride results in different aroma profiles when reacting flavor precursors than can be achieved in glycerol alone, or in an aqueous solvent allowing a flavor profile modulation while using the same flavor precursors. The higher MFT/FFT ratio obtained in the combination of glycerol and choline chloride compared to glycerol alone results in an enhanced meaty flavor.

Example 2

Reaction of Potassium 5-Ketogluconate and Cysteine 5-ketogluconic acid potassium salt has been reported to produce meat flavors when heated with cysteine (EP0058870). The effect of heating 5-ketogluconic acid potassium salt with cysteine in two different solvents was investigated; A) Glyceline 200—a 2:1 molar mixture of glycerol and choline chloride produced by Scionix, London, UK, and B) glycerol.

2.25 g of 5-ketogluconic acid potassium salt (Jungbunzlauer Int. AG, Basel) and 0.435 g L-cysteine hydrochloride monohydrate (Fluka) were weighed out in a 20 cm pyrex tube. Either glycerol, or Glyceline 200 were added to a final volume of 50 mL. The tube was closed with a Teflon lined stopper and the solution was heated to 125° C. for 25 min while stirring with a magnetic stirring bar. The tube was cooled to room temperature on ice. Aliquots were sampled for analysis (2×0.5 mL) and stored at −20° C. in sealed 20 mL vials until use.

Figure 3:
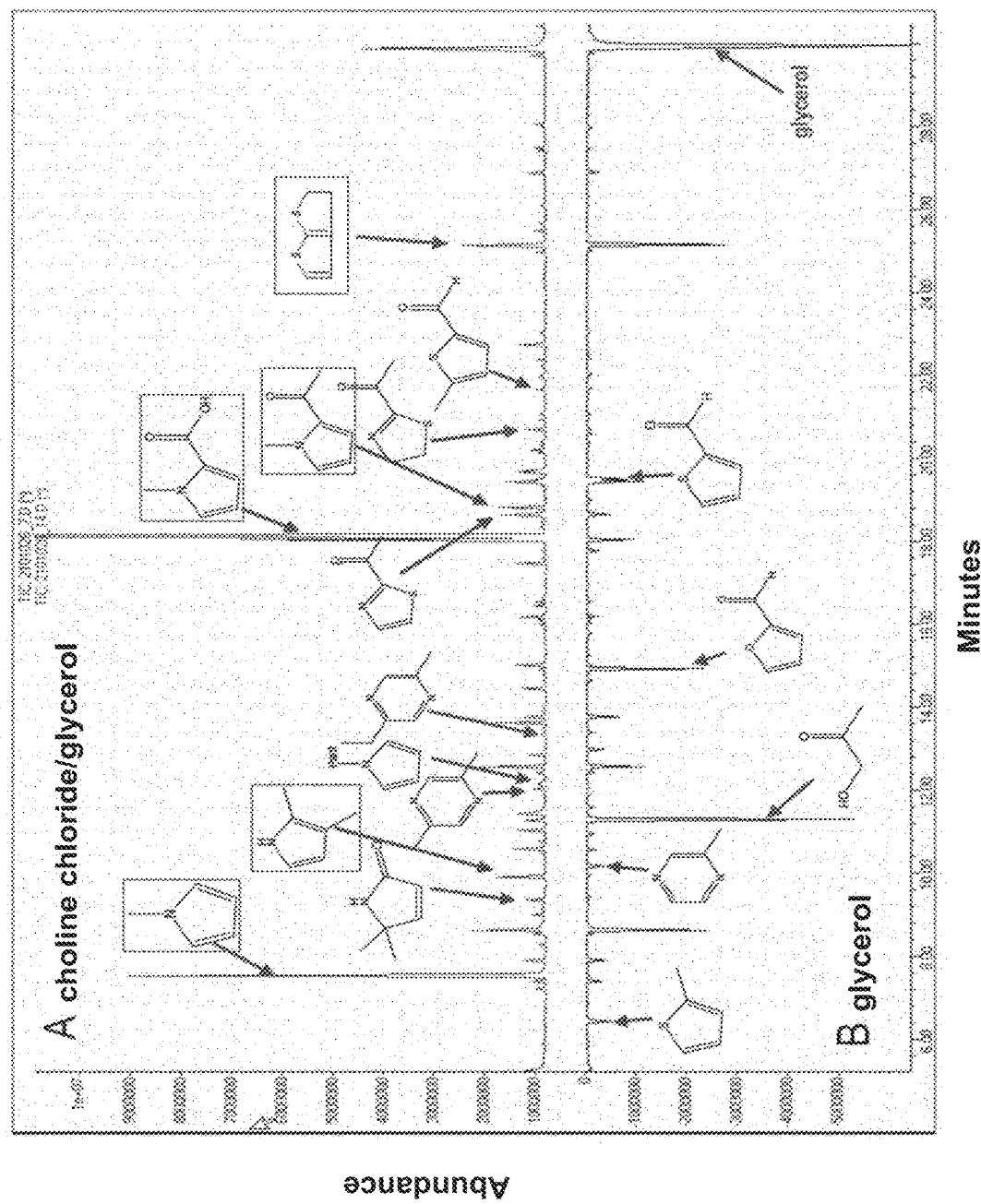
FIG. 3 shows a comparison of the chromatograms of the aroma compounds generated by reacting potassium 5-ketogluconate and cysteine in choline chloride/glycerol (A) and glycerol (B).

A qualitative analysis of the volatile profiles produced was made. GC-MS analyses were performed on a GC 6890A coupled to an MSD 5973 (Agilent, Palo Alto, Calif.) using a DB-FFAP column (30 m×0.25 mm×0.25 µm, J&W Scientific, Folsom, Calif.). 0.5 mL aliquots were transferred into 10 ml amber glass vials. A SPME fiber coated with olydimethylsiloxane/divinylbenzene with 65 µm thickness (Supelco no 57345-U) was inserted into the headspace and allowed to equilibrate for 30 min at room temperature. The SPME device was placed for 5 min in the GC injector and heated at 250° C. The injector was operated in splitless mode for 2 min, after which the split ratio was 20:1. Helium was used as carrier gas (1 mL/min, constant flow). The oven temperature was linearly programmed at 6° C./min from 30° C. (2 min) to 240° C. (25 min). The temperature of the ion source was 280° C. Mass spectra in the electron impact mode (EI) were generated at 70 eV and at a scan range from m/z 29-350. The resulting chromatograms are shown in FIG. 3. The Glyceline (glycerol/choline chloride) reaction medium was found to significantly modulate the aroma profile obtained. Pyrroles, thiazoles and some pyrazines were observed only in the Glyceline system, or in great excess. The glycerol system was more intense in glycerol, furfural, acetol, thiophenes and some pyrazines.

Example 3

Glycerol/Betaine and Glycerol/Choline Chloride—Effect of Addition of Flavor Precursors Glycerol/betaine and glycerol/choline chloride combinations were heated with and without the addition of flavor precursors. Oil is used to capture the aroma compounds formed which are oil soluble. (The flavor precursors, glycerol and quaternary ammonium compound are not dissolved in the oil.).

For the glycerol/betaine combination, 100 g betaine, 178.5 glycerol and 31 g water were mixed using Ultraturax stirrer until the formation of a homogeneous liquid (mix A1). A flavor precursor mixture was prepared by mixing 0.57 g rhamnose, 1.69 g fructose, 1.18 g lysine hydrochloride, 0.47 g glycine, 0.106 g disodium hydrogenophosphate and 2 g water using Ultraturax stirrer until the formation of an homogeneous liquid (Mix B). 3.2 g sunflower oil was mixed with 0.8 g Mix A1 and 0.547 g of Mix B. The total mixture was heated in a closed vessel for 40 min at 120° C. and then cooled down to room temperature. The experiment was repeated in the same way, but without the addition of the flavor precursors (Mix B). For the glycerol/choline chloride combination, 129.5 g choline chloride and 162.5 g glycerol were mixed using Ultraturax stirrer until the formation of an homogeneous liquid (Mix A2). The experiment was then repeated in the same way as for the glycerol/betaine combination above, except that Mix A1 was replaced by Mix A2

Volatile analysis was performed using GC-MS/SPME (Solid Phase Micro Extraction): The reaction sample vials were transported by the auto-sampler to the Gerstel incubator for sample equilibrium at 30° C. for 15 min with stirring. The headspace was sampled by introduction of the SPME fibre into the vial (SPME Fiber Polydimethylsiloxane/Divinylbenzene PDMS-DVB 65 µm 23 gauge needle, Supelco No 57345-U) at 30° C. After 10 min adsorption, the fibre was transported into the injector port in splitless mode at 250° C. for 5 min to desorb and transfer volatile compounds into the chromatographic column. The injector was equipped with a 0.75 mm i.d. liner (Supelco). GC separation was performed on a DB-1701 HP-5MS column of 30 m length, 0.25 mm ID and 0.25 µm film thickness (Agilent No 1220732). The oven (Agilent Technologies 6890A GC oven) temperature program was: 30° C. during 3 min, then heated at 6° C./min until 240° C., and held for 15 min. The GC was coupled to a MS (Agilent Technologies 5973) mass selective detector operating in EI/TIC (70 eV) mode.

The volatiles produced are shown in the table below (a ✓ indicates the presence of the compound):

| Volatile compounds | Betaine/Glycerol Without flavour precursors | Betaine/Glycerol With flavour precursors | Choline chloride/Glycerol Without flavour precursors | Choline chloride/Glycerol With flavour precursors | Odour Descriptor |
|---|---|---|---|---|---|
| 2,3-Butanedione | | ✓ | ✓ | ✓ | Buttery, creamy |
| 3-Aminopyrrolidine | | ✓ | | | — |
| 2,3-Pentanedione | | ✓ | | | Sweet, creamy |
| Acetic acid | ✓ | | | | Acid |
| Methylpyrazine | | ✓ | | ✓ | Boiled soybeans, popcorn |
| 2,5-Dimethylpyrazine | | ✓ | | ✓ | Nutty |
| 5-Methyl-2,3-dihydro-furanone | | | | ✓ | |
| 1,3-Propanediol | ✓ | | | | — |
| 2-Ethyl-5-methylpyrazine | | ✓ | | ✓ | Hazelnut, roasted |
| 2,3,5-Trimethylpyrazine | | ✓ | | ✓ | Caramel, cocoa |
| 3-Methoxy-1,2-propanediol | ✓ | ✓ | ✓ | ✓ | — |
| 5 Methylfurfural | | ✓ | | ✓ | Sweet, spicy |
| 2,5-Dihydrofuranone | | ✓ | | | — |
| 2-furanone | | ✓ | | ✓ | — |
| Furaneol | | ✓ | | ✓ | Caramel |
| Glycerol | ✓ | | | ✓ | — |
| Glycerin | | ✓ | ✓ | | — |
| 2,3 or 5,6-Dihydro-3,5-dihydroxy-2-methyl-pyran-4-one | | ✓ | | ✓ | Caramel |

It can be seen that the without flavor precursors the combination of glycerol with a quaternary ammonium compound does not produce compounds with significant or desirable odours. Acetic acid is formed from the oil (degradation, impurities) and is not a key flavor compound, glycerol is present in the starting mixture, and 3-methoxy-1,2-propanediol and 1,3 propanol stem from glycerol (impurities or generated during heating by degradation). With flavor precursors a range of desirable aromas are formed.

Example 4

Flavor Precursors in Glycerol/Quaternary Ammonium Compound Versus Flavor Precursors in Water—Effect on Reaction Speed A flavor precursor mixture containing rhamnose was reacted in a combination of glycerol/quaternary ammonium compound and compared to the same flavor precursor mixture reacted in water. The quantity of rhamnose remaining after 5 minutes of reaction at 120° C. was measured to indicate the speed of conversion of flavor precursors into aroma compounds.

Betaine/Glycerol: 100 g betaine, 178.5 glycerol and 31 g water were mixed using Ultraturax stirrer until the formation of a homogeneous liquid (mix A1). A flavor precursor mixture was prepared by mixing 0.57 g rhamnose, 1.69 g fructose, 1.18 g lysine hydrochloride, 0.47 g glycine, 0.106 g disodium hydrogenophosphate and 2 g water using Ultraturax stirrer until the formation of an homogeneous liquid (Mix B). 3.2 g sunflower oil was mixed with 0.8 g Mix A1 and 0.547 g of Mix B. The total mixture was heated in a closed vessel for 5 min at 120° C. and then cooled down to room temperature. The experiment was repeated in the same way, but 0.8 g of water was used instead of Mix A1.

Choline Chloride/Glycerol: 129.5 g choline chloride and 162.5 g glycerol were mixed using Ultraturax stirrer until the formation of a homogeneous liquid (Mix A2). A flavor precursor mixture was prepared by mixing 0.57 g rhamnose, 1.69 g fructose, 1.18 g lysine hydrochloride, 0.47 g glycine, 0.106 g disodium hydrogenophosphate and 2 g water using Ultraturax stirrer until the formation of an homogeneous liquid (Mix B). 3.2 g sunflower oil was mixed with 0.8 g Mix A2 and 0.547 g of Mix B. The total mixture was heated in a closed vessel for 5 min at 120° C. and then cooled down to room temperature.

Residual Rhamnose Quantification: 1 mL of the reaction medium was taken and oil removed by extraction with pentane (8 mL×3). The aqueous layers were centrifuged at 3400 t/min for 20 min at 8° C. The resulting solution was then diluted (45 µL for 100 mL). Residual rhamnose was quantified by high performance ion-exchange chromatography using an ICS-5000 ion chromatography system from Dionex (Thermo Fisher Scientific, 81 Wyman Street, Waltham, Mass. 02454, US) equipped with an AS-50 autosampler, OH— eluent generator, a suppressor, a column oven and a conductivity detector. The column was a Carbopac (PA1, 2×250 mm) coupled with a guard column (2×50 mm), both purchased from Dionex. The eluent was deionised water and the hydroxide (OH—) was produced by an Eluent Generator (KOH cartridge EGCIII) and released in the flow through a membrane (0.4 mL/min). Elution was an isocratic elution, fixed at 20 mM [OH—] from 0 to 49 min. Rhamnose was identified by comparing retention time with that of corresponding reference standard and was quantified using calibration curve.

Figure 4:
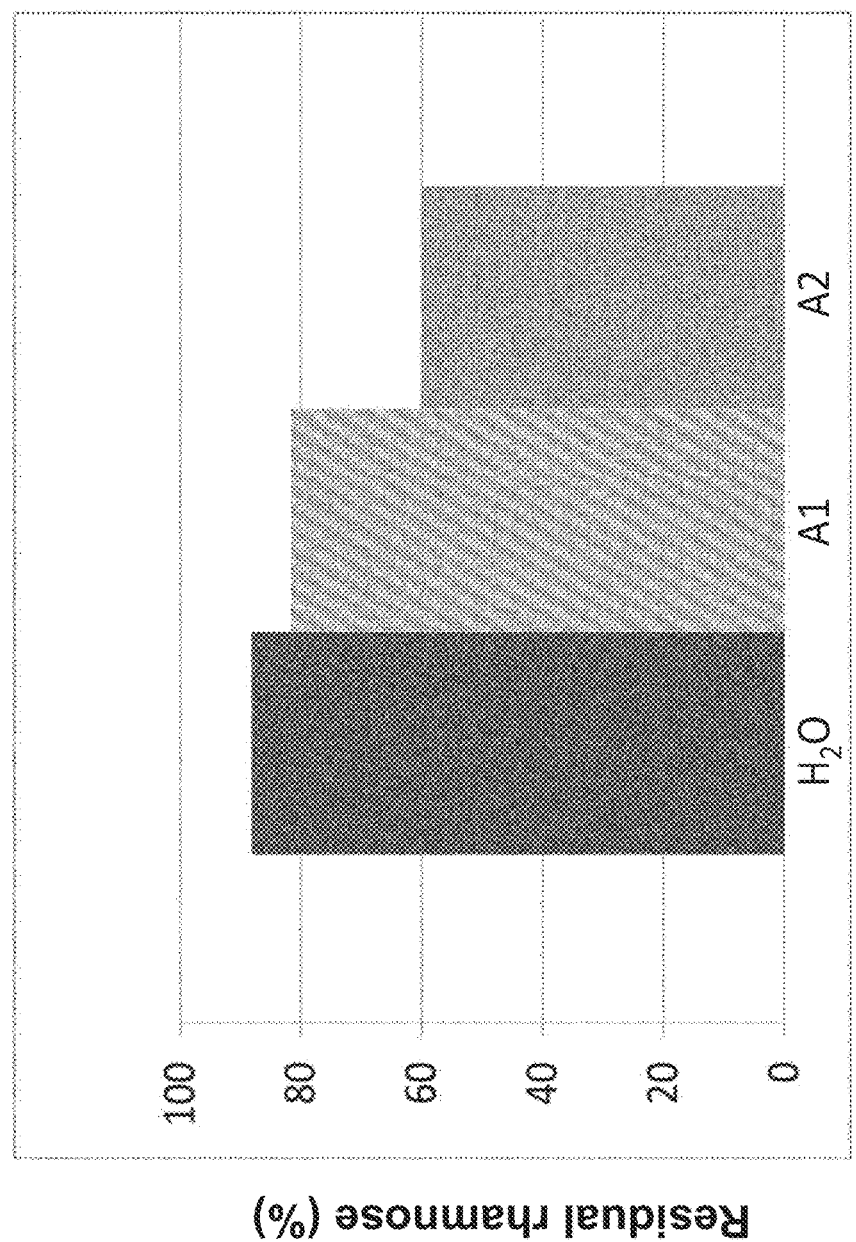
FIG. 4 shows the residual rhamnose in % from a flavor precursor mix after 5 minutes at 120° C. in different solvents: water ($H_2O$), betaine/glycerol (A1) and choline chloride/glycerol (A2).

Residual rhamnose (%) after 5 minutes at 120° C. is shown in FIG. 4; A1 is betaine/glycerol and A2 is choline chloride/glycerol. It can be seen that the rhamnose flavor precursor is reacted more rapidly in a combination of glycerol and quaternary ammonium compound than in water.

The invention claimed is:

1. A process for the preparation of flavor composition comprising:
   combining glycerol with a quaternary ammonium compound;
   adding at least one flavor precursor selected from the group consisting of amino acids and peptides to form a reaction mixture;

and heating the reaction mixture to form aroma compounds, wherein the glycerol is combined with a quaternary ammonium compound at a molar ratio ranging between 5:1 and 0.8:1.

2. The process according to claim 1 wherein the quaternary ammonium compound is selected from the group consisting of choline, betaine and carnitine.

3. The process according to claim 1 wherein the choline is in the form of choline chloride.

4. The process according to claim 1 wherein at least two flavor precursors are added to form the reaction mixture; the flavor precursors comprising at least one amino compound selected from the group consisting of amino acids and peptides; and at least one polyol which is not glycerol.

5. The process according to claim 4 wherein the at least one amino compound is selected from the group consisting of glycine, alanine, valine, norvaline, leucine, norleucine, aspartic acid, glutamic acid, asparagine, glutamine, arginine, lysine, serine, threonine, proline, tyrosine, cysteine, cystine, methionine, phenylalanine, histidine, tryptophan, dihydroxyphenylalanine, taurin, thiamine, carnosine and mixtures of these.

6. The process according to claim 4 wherein the at least one polyol is a reducing sugar.

7. The process according to claim 4 wherein the at least one polyol is selected from the group consisting of sorbitol; glucuronic acid; 5-keto-gluconic acid; galacturonic acid; iduronic acid; maltodextrin; glucose syrup; rhamnose; xylose; glucose; fructose; sucrose; lactose; maltose; xylitol; maltitol; erythritol; mannitol and mixtures of these.

8. The process according to claim 1 wherein the at least one flavor precursor further comprises a source of sulphur.

9. The process according to claim 8 wherein the source of sulphur is ammonium sulphide.

10. A food product comprising a flavor composition obtained by combining glycerol with a quaternary ammonium compound; adding at least one flavor precursor selected from the group consisting of amino acids and peptides to form a reaction mixture; and heating the reaction mixture to form aroma compounds, wherein
the glycerol is combined with a quaternary ammonium compound at a molar ratio ranging between 5:1 and 0.8:1.

11. The food product according to claim 10 wherein the food product contains 140 mg of sodium or less per 100 g.

12. The food product according to claim 10 wherein the food product is selected from the group consisting of a bakery product, a dairy product, a confectionery product, a cereal product and a culinary product.

13. The food product according to claim 10 wherein the food product is a pet food.

* * * * *